United States Patent [19]

Früngel

[11] 3,808,704

[45] May 7, 1974

[54] ARRANGEMENT FOR SIMULATING ELECTRICALLY RADIATION AND LIGHT FROM NUCLEAR EXPLOSIONS

[76] Inventor: Frank Früngel, Herwigredder 105a, 2 Hamburg 56, Germany

[22] Filed: Nov. 19, 1971

[21] Appl. No.: 200,538

[30] Foreign Application Priority Data
Nov. 24, 1970  Germany............................ 2057735

[52] U.S. Cl........................................ 35/1, 315/323
[51] Int. Cl............................................ G09b 23/20
[58] Field of Search .................. 35/1; 315/240, 323; 250/209

[56] References Cited
UNITED STATES PATENTS

| | | | |
|---|---|---|---|
| 3,363,329 | 1/1968 | Filipov..................................... | 35/1 |
| 3,532,931 | 10/1970 | Coté et al. ........................... | 250/209 |
| 2,814,762 | 11/1957 | Jackson et al. ...................... | 315/323 |
| 3,208,159 | 9/1965 | Filipov..................................... | 35/1 |
| 3,171,057 | 2/1965 | Buckingham ......................... | 315/323 |

Primary Examiner—Robert W. Michell
Assistant Examiner—J. H. Wolff
Attorney, Agent, or Firm—Michael S. Striker

[57] ABSTRACT

A portable arrangement for simulating the electromagnetic pulse and light of a nuclear explosion. An antenna circuit has an inductance and a charging capacitor. A spark gap is connected in parallel with the capacitor. To simulate the electromagnetic pulse, the capacitor is charged from a high voltage until breakdown occurs across the spark gap, thereby causing the EMP to be radiated from the antenna. An electronic timing circuit is connected to the capacitor and furnishes a signal igniting a flash a predetermined time interval after creation of the EMP. A second timing circuit initiates a second flash a predetermined time interval following the first flash. The EMP and first flash test the nuclear detection sensor, while the second tests the operation of a protective shutter associated with the sensor.

9 Claims, 3 Drawing Figures

PATENTED MAY 7 1974 3,808,704

ARRANGEMENT FOR SIMULATING ELECTRICALLY RADIATION AND LIGHT FROM NUCLEAR EXPLOSIONS

BACKGROUND OF THE INVENTION

In carrying out civil defense, it is essential to verify rapidly the detection of nuclear weapon explosions. Such verifications were made possible, heretofore, in laboratories and measuring locations. In the past, the civilian resident did not have available the possibility of verifying such detection at any desired location, in an economical manner.

SUMMARY OF THE INVENTION

It is an object of the present invention to provide a simple portable simulator which can be placed in the vicinity of a sensor for the purpose of verifying the functional operability of the sensor in a fail-safe manner.

It is also an object of the present invention to provide a simulator, as set forth, which may be placed within, for example, 15 to 30 meters from the sensor.

It is a further object of the present invention to provide the foregoing simulator, which is economically fabricated.

A still further object of the present invention is to provide a simulator of the foregoing character which is reliable in operation.

The objects of the present invention are achieved by providing a simulator having the following features:

a. An antenna circuit having an inductance and storage capacitor, has a spark gap which is connected in parallel with the storage capacitor. The capacitor is charged through a switch from a high voltage source. The discharge of said capacitor circuit is preferably non-oscillating and has a rise time of about $10^{-8}$ sec, a decay time in the order of about $10^{-7}$ seconds, so being properly dimensioned to simulate EMP of a nuclear explosion.

b. A first flash apparatus is provided, which is actuated from the capacitor discharge. It simulates the first rise of the nuclear light flash during several microseconds because properly operating sensors have to derive from this rise the start signal to activate the optical shutter for eye protection.

c. A first electronic timing device is started into operation upon appearance of a spark across the spark gap, for providing a time delay used in conjunction with the flash apparatus. The amount between the EMP and this light flash depends on the caliber of the nuclear explosion. The properly operating sensor must start the shutter already at very small nuclear explosions and the time delay has normally to be set to the smallest delay, i. e., smallest caliber of nuclear explosions.

For testing eye protective shutters of apertures, in particular, the simulator in accordance with the present invention has additionally, a second flash apparatus operated through capacitor discharge. A second timing device becomes set into operation upon execution of the first flash from the first flash apparatus, and this second timing device provides a delay interval used in conjunction with operating the second flash apparatus. If the human eye looks through a protective shutter, the shutter if properly in operation, must close so that the eye can only see a weak light impression from the first EMP which produces several microseconds a constant rise of light and starts by this rise the sensor of the shutter. But the eye should never see the second more intensive light flash which simulats the light of the second maximum of the nuclear explosion. If the eye has a visual sensation of this second lamp, something is wrong with the sensor and/or the shutter under examination.

The electronic and optical components used in the simulator of the present invention, can be confined within a carrying case. The associated voltage supplies for the simulator can also be held or mounted within such a carrying case. The carrying case is, furthermore, provided preferably with a rod antenna, and has a metallic coating which serves as a counterweight for the antenna.

The power supplies used for the simulator may be in the form of conventional and commercially available circuits. The timing devices for generating the required time intervals in the simulator, furthermore, may be in the form of electronic types of time delay devices. Such time delay devices or timing circuits may be in the form of commercially available RC networks. Such RC networks, moreover, may be made variable by providing that either the capacitor or the resistor or both in the RC network are of the adjustable types.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
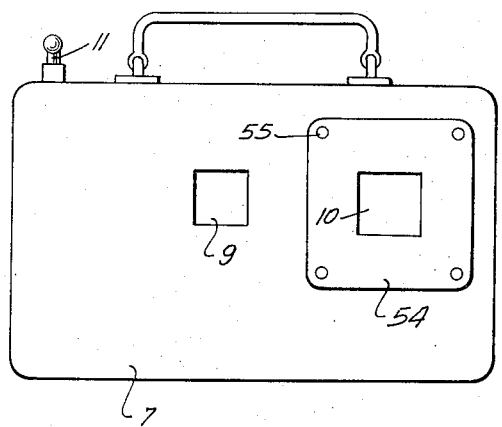
FIG. 1 is an elevational view of a carrying case containing a simulator in accordance with the present invention.
Figure 2:
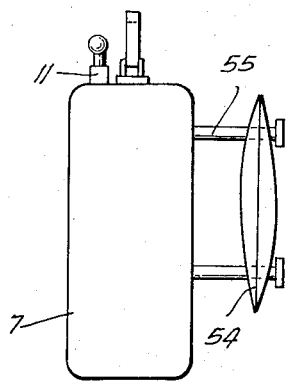
FIG. 2 is an end view of the carrying case of FIG. 1.
Figure 3:
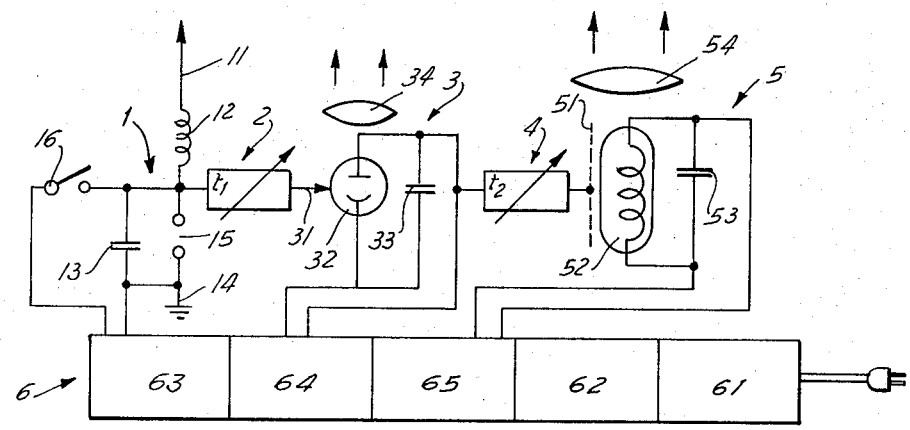
FIG. 3 is a schematic diagram of the electrical and optical components and their functional interrelationships in the circuitry used for the simulator held within the carrying case of FIGS. 1 and 2.

Referring to the drawing, each nuclear weapon explosion has an initial flash with an electromagnetic pulse which is also represented or designated as an EMP signal. In order to simulate this process, the present invention provides for an EMP generator 1 in the simulating apparatus. Connected to the EMP generator 1, is a timing device 2 and a flash device 3. A second timing network 4 and a second flash apparatus 5 is further provided in order to permit fail-safe verification, in accordance with the present invention. These additional elements 4 and 5 are provided in conjunction with the simulator apparatus of the present invention. The flash transmitted by the apparatus 5 is delayed in relation to the flash transmitted by the flash apparatus 3, and the eye, looking through the protection shutter should be unable to see any light of this source if sensor and shutter under examination operated properly. A voltage source 6 is provided for supplying power to the components 1 to 5.

The components or circuits 1 to 6 are contained within a carrying case 7 which has a telescopic antenna 11 and two windows 9 and 10. Mounted behind these two windows 9 and 10 are the flash bulbs of the flash devices or apparatuses 3 and 5. The carrying case is preferably provided with a metallic coating. At the same time, the carrying case can be constructed entirely of a light-weight metal in the form of aluminum or magnesium, for example, so that the carrying case can serve as a balancing capacitor the telescopic antenna 11.

For supplying power to the apparatus, a rectifier 61 may be used for connecting the apparatus to a utility supply outlet. A group of primary or secondary elements 62 may also be used for this purpose. The voltage supply sources 61 and 62 serve to supply power to three high voltage apparatuses or devices 63, 64, and 65.

To generate the EMP signal, the transmitter is supplied with power from the high voltage unit 63. The transmitter has a rod antenna 11, an inductance 12 and a small storage capacitor 13. The inductance 12 is connected, through the storage capacitor 13, with the carrying case 7 constructed to form a balancing capacitor 14. A spark gap 15 is connected in parallel with the storage capacitor 13. The spark gap 15 will have a spark across it when, for example, 10 to 30 kV are applied across the gap. If the switch 16 connected in the supply circuit for the EMP generator is closed, the capacitor 13 will be charged to a voltage at which the spark gap 15 flashes over causing a sudden voltage drop so that a voltage vector is radiated from the rod antenna 11. Depending upon the dimensions and values of the antenna circuits, this voltage vector can rise very steeply, and can attain the maximum of the radiated electromagnetic field strength within the time interval of, for example, ten ns, and a decay of, for example, .1 $\mu$second. Due to the resistance of the spark in connection with the capacitance and inductance the circuit is so strongly damped that no oscillation at all or only a weak one is achieved. A greater capacity gives a smaller spark resistance and less damping so that the emitted EMP signal can be adapted to the nature of the event which is subject to simulation.

As soon as a spark appears across the gap 15, the variable electronic timing device 2 commences to operate. After the expiration of the time delay, an ignition pulse is applied to the ignition electrode 31 of the flash bulb 32 which is connected to the output of the timing device 2. This time delay generated by the timing device 2 is preferably variable between 4 $\mu$s and 4 ms, in order to be capable of imitating different calibers of nuclear weapon explosions.

As soon as the ignition pulse across the ignition electrode 31 is applied, the storage capacitor 33, connected in parallel with the flashbulb 32, becomes discharged in, for example, a few microseconds. The capacitor 33 was beforehand charged from the high voltage supply 64. As a result of igniting the flashbulb 32, a radiation pulse is transmitted through the collimating lens 34. The lens 34 and the flashbulb 32 are mounted in front of the window 9 of the carrying case 7. A sensor to be verified is located, for example, 15 to 30 meters from the carrying case 7. The sensor detects the initial flash of a nuclear weapon explosion during the first $\mu$seconds, and therefore a nearly constant rise of light must be provided for instance 10 $\mu$seconds. During this time every sensor, properly made, should have been released.

It is further desirable to conduct a complete test, including the testing of eye protective shutters or apertures under conditions simulating the initial flashes of nuclear weapon explosions. For this purpose, a still further timing device 4 is coupled to the flashbulb circuit. This timing device 4 commences to operate and measure time upon the flashing of the bulb 32. After expiration of a predetermined time delay, the timing device 4 causes an ignition pulse to be applied to the ignition electrode 51 of the flashbulb 52 of the second flash apparatus 5. The flashbulb 52 has also a capacitor 53 connected in parallel with it. This capacitor 53 is charged beforehand from a high voltage supply 65. The flashbulb 52 has a large surface, and is preferably designed so as to have a spiral shape in view of the fact that this lamp should be able to emit plenty of light in a relatively slow manner so simulate the second intensive but long maximum of the nuclear explosion. The flashbulb 52 is mounted behind a substantially large collimating lens 54. The timing device 4 is also constructed so as to have an adjustable time delay. Since the capacitor 52 is substantially large, a considerably large and exceptionally high intensity light flash results from the ignition of the flashbulb 52. Such a light flash may have, for example, 100 to 10,000 Ws of energy.

In order to increase the strength of the flash, the lens 54 is constructed in the form of a substantially large surface Fresnell lens. Such a Fresnell lens serves to save weight. The Fresnell lens, furthermore, is mounted in front of the window 10 through four rods 55 which maintain the lens space from the window. When the simulator is not in use, the lens 54 as well as the spacing rods 55 can be stored within the carrying case. When desired, sliding locks can also be arranged in conjunction with the windows 9 and 10. A shutter being actuated by the sensor of the system under examination must close for proper eye protection latest in about 100 $\mu$seconds after receiving the first rise of light corr. to the beginning of light emission of the explosion. Therefore the observer, looking through the shutter onto the very bright second flash should not see any light. If he has a visual sensation, the shutter operated improperly.

Upon closure of the switch 16, a very steep or concentrated EMP signal appears at the rod antenna 11. A first flash appears then at the window 9, thereafter, and a second flash appears subsequently at the window 10. These first and second flashes at the windows 9 and 10, respectively, are essentially high intensity light flashes.

If, for example, a protective shutter or aperture for protecting the human eye from nuclear weapon radiation has responded correctly, the exceptionally bright light should no longer be visible from the window 10. The light from the window 10 is concentrated or collimated through the lens 54. By using the small carrying case simulator in accordance with the present invention, it is possible to obtain verification for the sensor system itself. It is also possible through this present invention, to obtain moreover verification of the shutter or aperture which is used, from the viewpoint of optical density or transmissibility.

The three capacitors 13, 33 and 53 are charged only once for each test or verification. As a result, the high voltage supplies 63, 64 and 65 can be in the form of three substantially small electronic charging apparatuses. If the applied operating voltage for the three capacitors is identical, then a single electronic charging apparatus is sufficient. The charging apparatus of voltage supplies are preferably constructed of the same type of circuits which are used in commercially available electronic flash apparatuses used in photography. Such charging apparatuses can be conveniently supplied with power from a built-in voltage source 62. In view of the greater energy, the size of the power supplies may be larger than the power supplies that are commercially available for use in amateur photography. Power supplies consisting of primary cells and dry cells, may also be used. The entire carrying case has, thereby, complete independence of any utility supply outlet, when operating in conjunction with such storage cells in the form of primary cells or dry cells.

In order to increase further the effectiveness of the simulator apparatus in accordance with the present invention, it is possible to connect the carrying case 7, furthermore, with ground potential. With such grounding of the case 7, an essentially stronger emission of the electrical vector from the antenna 11 is obtained.

It will be understood that each of the elements described above, or two or more together, may also find a useful application in other types of simulators for radiation pulses from nuclear explosions differing from the types described above.

While the invention has been illustrated and described as embodied in a simulator for radiation pulses from nuclear explosions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Device for generating an electromagnetic and a light pulse having characteristics corresponding to the characteristics of an electromagnetic and a light pulse generated during a nuclear explosion, comprising, in combination, antenna circuit means for radiating an electromagnetic pulse having a rise time corresponding to the rise time of said electromagnetic pulse of said nuclear explosion, said antenna circuit means comprising an antenna, inductance means connected to said antenna, capacitor means connected to said inductance means and means for creating a spark upon external activation connected to said capacitor means; timing means connected to said capacitor means for furnishing an ignition signal a predetermined time interval following creation of said spark; and flash means connected to said timing means for furnishing a light flash having a rise time of the order of several microseconds in response to said ignition signal, whereby an electromagnetic pulse and a light pulse separated by a predetermined interval and having characteristics corresponding to the characteristics of corresponding flashes generating during a nuclear explosion are furnished for testing the operation of the sensor of a nuclear explosion detector.

2. A device as set forth in claim 1, wherein said flashing means comprise first flashing means furnishing said light flash having a rise time in the order of several microseconds in response to said ignition signal, and second flashing means for furnishing an additional light flash in response to a delayed ignition signal; further comprising second timing means having an input connected to said first flashing means and an output connected to said second timing means for furnishing said delayed ignition signal to said second flashing means a predetermined time interval after operation of said first flashing means.

3. A device as set forth in claim 1, further comprising a carrying case for enclosing said arrangement.

4. A device as set forth in claim 3, wherein said carrying case is a metallic carrying case constituting a balancing capacity for said antenna means.

5. A device as set forth in claim 3, wherein in said carrying case has wall openings; and wherein said first and second flashing means are mounted adjacent to said wall openings within said carrying case.

6. A device as set forth in claim 5, and further comprising lens means mounted in front of said flashing means.

7. A device as set forth in claim 6, wherein said lens means comprise a Fresnel lens.

8. A device as set forth in claim 7, further comprising mounting means for mounting said Fresnel lens exterior to said carrying case in front of said second flashing means.

9. A device as set forth in claim 1, wherein said timing means are adjustable for changing said predetermined time intervals for simulation of different calibers of explosions.

* * * * *